US012608919B2

(12) United States Patent
Vecerik et al.

(10) Patent No.: US 12,608,919 B2
(45) Date of Patent: Apr. 21, 2026

(54) SEMI-SUPERVISED KEYPOINT BASED MODELS

(71) Applicant: GDM Holding LLC, Mountain View, CA (US)

(72) Inventors: Mel Vecerik, London (GB); Jonathan Karl Scholz, London (GB); Jean-Baptiste Regli, London (GB)

(73) Assignee: GDM Holding LLC, Mountain View, CA (US)

( * ) Notice: Subject to any disclaimer, the term of this patent is extended or adjusted under 35 U.S.C. 154(b) by 407 days.

(21) Appl. No.: 18/006,229

(22) PCT Filed: Jul. 28, 2021

(86) PCT No.: PCT/EP2021/071202
§ 371 (c)(1),
(2) Date: Jan. 20, 2023

(87) PCT Pub. No.: WO2022/023442
PCT Pub. Date: Feb. 3, 2022

(65) Prior Publication Data
US 2023/0281966 A1 Sep. 7, 2023

Related U.S. Application Data

(60) Provisional application No. 63/057,861, filed on Jul. 28, 2020.

(51) Int. Cl.
*G06V 10/774* (2022.01)
*G06V 10/82* (2022.01)

(52) U.S. Cl.
CPC ............ *G06V 10/774* (2022.01); *G06V 10/82* (2022.01)

(58) Field of Classification Search
CPC ...... G06V 10/16; G06V 20/10; G06V 20/647; G06V 10/774; G06V 10/82;
(Continued)

(56) References Cited

U.S. PATENT DOCUMENTS

2021/0125052 A1* 4/2021 Tremblay ................. G06N 3/08

FOREIGN PATENT DOCUMENTS

| CN | 109858445 A | 6/2019 |
| CN | 110084221 A | 8/2019 |
| (Continued) | | |

OTHER PUBLICATIONS

Yao, Yuan, Yasamin Jafarian, and Hyun Soo Park. "Monet: Multiview semi-supervised keypoint detection via epipolar divergence." Proceedings of the IEEE/CVF international conference on computer vision. 2019. (Year: 2019).*
(Continued)

*Primary Examiner* — Gregory A Morse
*Assistant Examiner* — Stefano Anthony Dardano
(74) *Attorney, Agent, or Firm* — Fish & Richardson P.C.

(57) ABSTRACT

A method for training a neural network to predict keypoints of unseen objects using a training data set including labeled and unlabeled training data is described. The method comprising: receiving the training data set comprising a plurality of training samples, each training sample comprising a set of synchronized images of one or more objects from a respective scene, wherein each image in the set is synchronously taken by a respective camera from a different point of view, and wherein a subset of the set of synchronized images is labeled with ground-truth keypoints and the remaining images in the set are unlabeled; and for each of one or more training samples of the plurality of training samples: training the neural network on the training sample by updating current values of parameters of the neural network to mini-
(Continued)

mize a loss function which is a combination of a supervised loss function and an unsupervised loss function.

18 Claims, 5 Drawing Sheets

(58) Field of Classification Search
CPC .................. G06V 10/7753; G06T 7/70; G06T 2207/20081; G06T 2207/20084; G06T 7/0004; G06F 18/2155; G06F 18/254; G06F 18/214
See application file for complete search history.

(56) References Cited

FOREIGN PATENT DOCUMENTS

| | | | |
|-----|-------------|---|---------|
| CN | 110176006 A | | 8/2019 |
| CN | 110348412 A | * | 10/2019 |
| CN | 111160142 A | | 5/2020 |
| DE | 102019106123 A1 | | 9/2019 |
| EP | 3605394 A1 | | 2/2020 |
| JP | 2019530105 | | 10/2019 |
| JP | 2020514890 | | 5/2020 |

OTHER PUBLICATIONS

Rhodin, Helge, et al. "Learning monocular 3d human pose estimation from multi-view images." Proceedings of the IEEE conference on computer vision and pattern recognition. 2018. (Year: 2018).*

Simon, Tomas, et al. "Hand keypoint detection in single images using multiview bootstrapping." Proceedings of the IEEE conference on Computer Vision and Pattern Recognition. 2017. (Year: 2017).*

Qiu, Haibo, et al. "Cross view fusion for 3d human pose estimation." Proceedings of the IEEE/CVF international conference on computer vision. 2019. (Year: 2019).*

Newell, Alejandro, Kaiyu Yang, and Jia Deng. "Stacked hourglass networks for human pose estimation." European conference on computer vision. Cham: Springer International Publishing, 2016. (Year: 2016).*

International Preliminary Report on Patentability in International Appln. No. PCT/EP2021/071202, dated Feb. 9, 2023, 9 pages.

International Search Report and Written Opinion in International Appln. No. PCT/EP2021/071202, dated Nov. 9, 2021, 14 pages.

Kullback et al., "On Information and Sufficiency," The Annals of Mathematical Statistics, Mar. 1951, 22(1):79-86.

Rhodin et al., "Learning Monocular 3D Human Pose Estimation from Multi-View Images," CoRR, Mar. 13, 2018, arXiv:1803.04775v2, 10 pages.

Office Action in Japanese Appln. No. 2023-506047, dated Apr. 1, 2024, 8 pages (with English translation).

Notice of Allowance in Japanese Appln. No. 2023-506047, dated Sep. 30, 2024, 5 pages (with English translation).

Office Action in Chinese Appln. No. 202180059057.7, mailed on Dec. 26, 2025, 17 pages (with English translation).

Gundavarapu et al., "Structured Aleatoric Uncertainty in Human Pose Estimation," IEEE/CVF Conference on Computer Vision and Pattern Recognition Workshops (CVPRW), 2019, 4 pages.

Iskakov et al., "Learnable Triangulation of Human Pose," IEEE International Conference on Computer Vision (ICCV), 2019, 10 pages.

Nibali et al., "Numerical Coordinate Regression with Convolutional Neural Networks," CoRR, submitted on May 3, 2018, arXiv:1801.07372v2, 10 pages.

Office Action in Korean Appln. No. 10-2023-7004635, mailed on Feb. 21, 2026, # pages (with English translation).

* cited by examiner

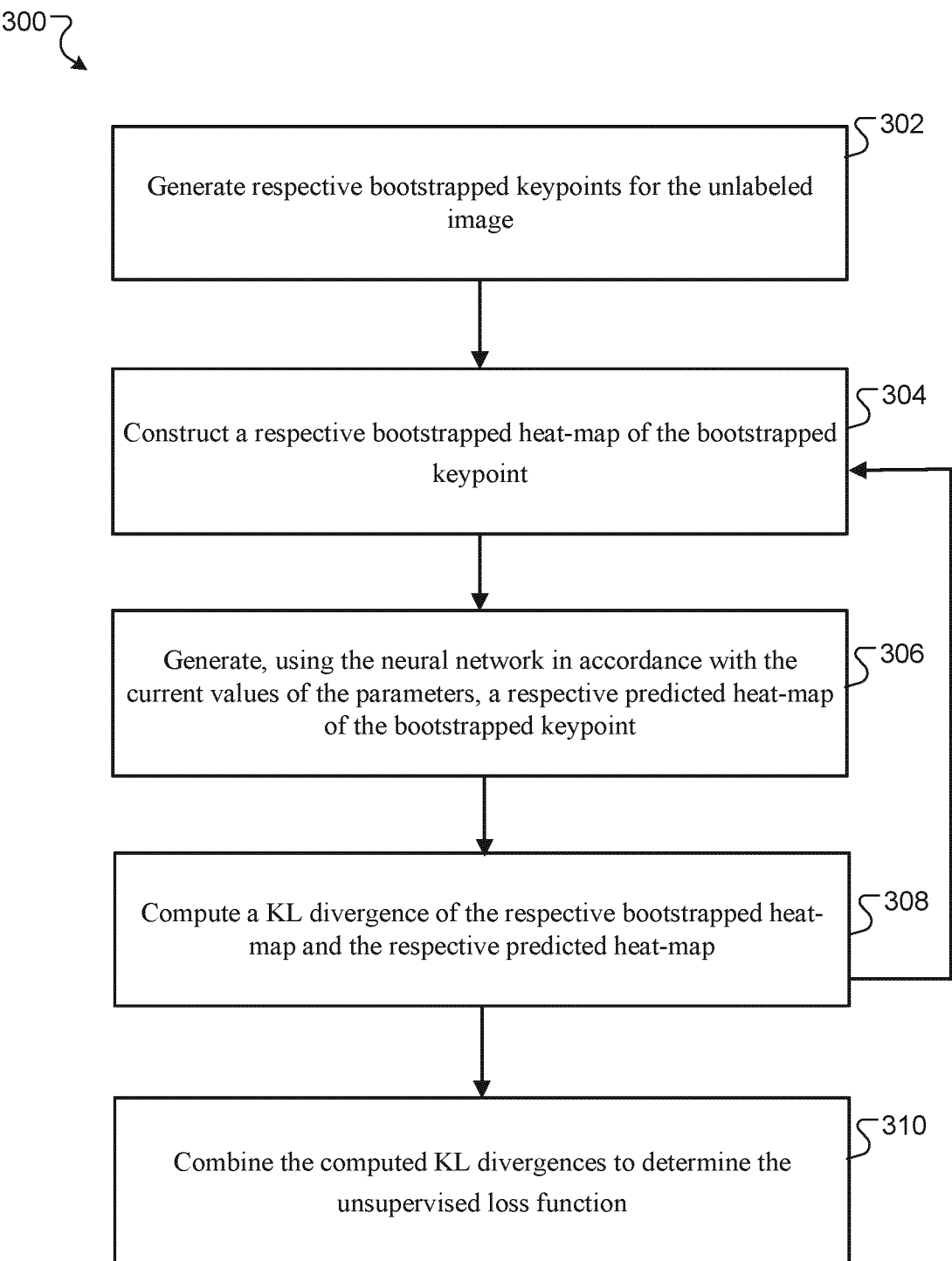

300

Generate respective bootstrapped keypoints for the unlabeled image 302

Construct a respective bootstrapped heat-map of the bootstrapped keypoint 304

Generate, using the neural network in accordance with the current values of the parameters, a respective predicted heat-map of the bootstrapped keypoint 306

Compute a KL divergence of the respective bootstrapped heat-map and the respective predicted heat-map 308

Combine the computed KL divergences to determine the unsupervised loss function 310

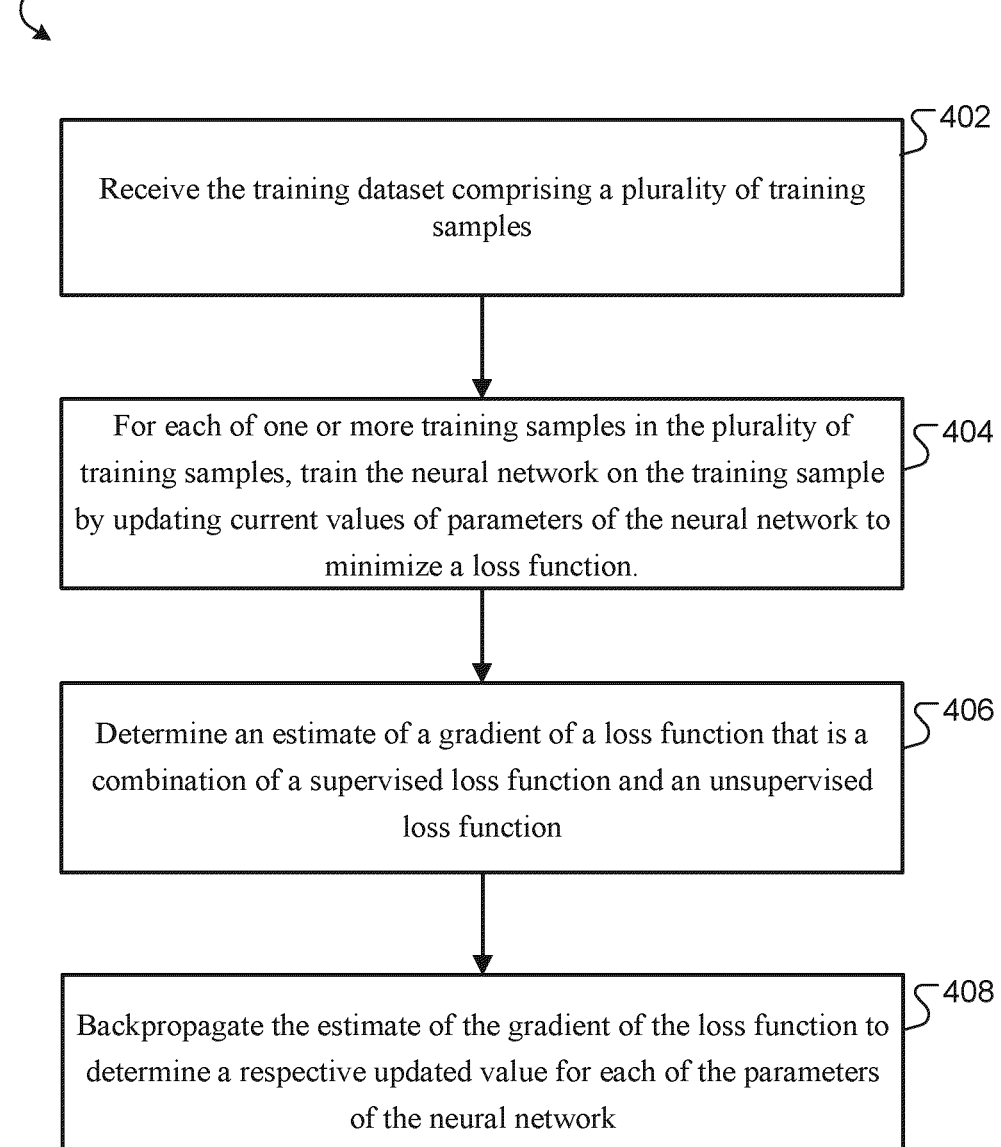

402

Receive the training dataset comprising a plurality of training samples

404

For each of one or more training samples in the plurality of training samples, train the neural network on the training sample by updating current values of parameters of the neural network to minimize a loss function.

406

Determine an estimate of a gradient of a loss function that is a combination of a supervised loss function and an unsupervised loss function

408

Backpropagate the estimate of the gradient of the loss function to determine a respective updated value for each of the parameters of the neural network

FIG. 4

SEMI-SUPERVISED KEYPOINT BASED MODELS

CROSS REFERENCE TO RELATED APPLICATIONS

This application is National Stage Application under 35 U.S.C. § 317 and claims the benefit of International Application No. PCT/EP2021/071202, filed Jul. 28, 2021, which is a non-provisional of and claims priority to U.S. Provisional Patent Application No. 63/057,861, filed on Jul. 28, 2020, the entire contents of which are hereby incorporated by reference.

BACKGROUND

This specification relates to training machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that train a neural network to predict keypoints of unseen objects using a training data set including labeled and unlabeled training data.

According to an aspect, there is provided a method for training a neural network to predict keypoints of objects using a training data set comprising labeled and unlabeled training data. The method comprises receiving the training dataset comprising a plurality of training samples, each training sample comprising a set of synchronized images of one or more objects from a respective scene, wherein each image in the set is synchronously taken by a respective camera from a different point of view, and wherein a subset of the set of synchronized images is labeled with ground-truth keypoints and the remaining images in the set are unlabeled. For each of one or more training samples in the plurality of training samples: the neural network is trained on the training sample by updating current values of parameters of the neural network to minimize a loss function. The loss function is a combination of a supervised loss function and an unsupervised loss function. The supervised loss function minimizes a difference between the ground-truth keypoints and respective predicted keypoints generated by the neural network for the labeled images in accordance with the current values of the parameters of the neural network. The unsupervised loss function minimizes multi-view inconsistency among respective predicted keypoints generated by the neural network for the unlabeled images taken from different points of view of a same scene in accordance with the current values of the parameters.

A keypoint may be any point of interest in the environment that is useful to detect for performing a particular task. For example, a keypoint may be a point on an object that is important for recognizing the object or motion of the object.

The keypoint may be a point on a head, front paws, body or tail of a moving animal. As another example, a keypoint may be a joint of a robotic arm or leg. The images in the training data set that are labeled with ground-truth keypoints provides the neural network with initial target points to be considered as keypoints. The particular training method substantially reduces the amount of labeled training data required to effectively train a neural network to predict keypoints. It will be appreciated that the training dataset may comprise training samples that have only a set of unlabeled synchronized images without any labeled images (the empty set also being a subset).

The method may utilize a plurality of cameras synchronized for capturing images of an environment from different points of view at substantially the same time or a single camera configured to capture a plurality of different points of view. The one or more cameras may be configured to capture a video sequence of the environment and the images may correspond to frames of the video sequence.

The one or more objects in the scene may be dynamic objects. For example, the object may be in motion or may be deformable when interacted with.

The neural network may comprise one or more of (i) one or more down-sampling layers, (ii) one or more convolutional layers, (iii) one or more residual layers, (iv) one or more up-sampling layers, (v) a spatial argmax layer, (vi) a bilinear up-sampling layer, (vii) a 3D estimation layer, or (viii) a softmax layer.

The neural network is configured to receive an input image depicting a scene and to process the input image to generate an output. The output of the neural network 120 includes a respective heat-map for each of a plurality of different possible keypoints of one or more objects in the scene. The heat-maps can be generated in parallel, i.e., in a single pass through the neural network. The heat-map for a given possible keypoint includes a respective score for each of a plurality of locations in the image, e.g., for each pixel in the image, that represents the likelihood that the given possible keypoint is located at the location.

The loss function may comprise an additional component to regularize the parameters.

The loss function may be a weighted combination of the supervised loss function, the unsupervised loss function, and the additional component.

The method may further comprise, for each labeled image in the training sample and for each of the ground-truth keypoints in the labeled image: constructing a respective ground-truth heat-map of the ground-truth keypoint in the labeled image and generating, using the neural network with the current values of the parameters, a respective predicted heat-map of the ground-truth keypoint in the labeled image. That is, the respective predicted heat-map of the ground-truth keypoint may be the predicted heat-map corresponding to the ground-truth keypoint generated by processing the labeled image using the neural network. The method may further comprise computing a Kullback-Leibler (KL) divergence of the respective ground-truth heat-map and the respective predicted heat-map. The supervised loss function may be a combination of the computed KL divergences. For example, the combination may be a combination of the computed KL divergences for each ground-truth keypoint in the labeled image and for each labeled image. The KL divergence may also be computed for the unlabeled images in the training sample by deriving the location of the ground-truth keypoint for the point of view that the unlabeled image corresponds to. A ground-truth heat-map for this location may be constructed and KL divergence between the ground-truth heat-map and predicted heat-map computed. The KL divergences computed from the unlabeled images in this way may be combined with the KL divergences computed for the labeled images to provide the supervised loss function.

The method may further comprise, for each of the unlabeled images in the training sample: generating respective bootstrapped keypoints for the unlabeled image, wherein the bootstrapped keypoints are treated as labels for the unlabeled image. The method may further comprise, for each of the respective bootstrapped keypoints: constructing a respective bootstrapped heat-map of the bootstrapped keypoint; generating, using the neural network in accordance with the current values of the parameters, a respective predicted heat-map of the bootstrapped keypoint; and computing a KL divergence of the respective bootstrapped heat-map and the respective predicted heat-map. The unsupervised loss function may be a combination of the computed KL divergences. For example, the neural network may be used to generate a predicted heat-map for each of the unlabeled images. These predicted heat-maps provide individual estimates for the location of the keypoint. As the unlabeled images each provides a different point of view of the same scene, the individual estimates may be combined to provide a final estimate of the location of the keypoint, i.e. the bootsrapped keypoint. The bootstrapped keypoint may then be used as a label. A heat-map may be constructed from the bootstrapped keypoint in a similar way to how a "ground-truth" heat-map is constructed for a ground-truth keypoint. The KL divergence between the original predicted heat-maps and the "ground-truth" bootstrapped keypoint heat map may be computed. This process can be repeated for each keypoint and the computed KL divergences for each keypoint can be further combined to provide the unsupervised loss.

Generating the respective bootstrapped keypoints in the unlabeled image may comprise solving a weighted least-squares optimization problem. For example, the combination of the individual estimates for the keypoint to provide the location of the bootstrapped keypoint may comprise solving a weighted least-squares optimization problem.

Each KL divergence may be further weighted by an associated importance factor in the loss function. The associated importance factor of each KL divergence may be a function of a variance of the respective predicted heat-map.

The one or more objects in the respective scene may be (i) one or more robotic systems or (ii) one or more objects in an environment that the one or more robotic systems are interacting with.

The training dataset may be obtained by capturing images whilst the robotic system is performing automated scripted actions. For example, the robotic system may be configured to move in various directions in the environment to provide image captures of the robot and the environment in different positions. In another example, the training dataset may be obtained based upon image captures of where a human operator is controlling the robotic system, such as to provide a demonstration of the task.

The predicted keypoints generated by the neural network may be used for controlling a robotic system. For example, the keypoints may correspond to objects in the environment that the robotic system is to manipulate. The control system may issue actions to the robotic system based upon the locations and relationships between the tracked keypoints and the state of the robotic system. The actions can include for example, chaining the position, velocity, or force/torque/ acceleration for one or more joints or parts of the robotic system or higher-level commands.

Controlling the one or more robotic systems may comprise using a reinforcement learning technique to learn a control policy. The predicted keypoints may be used as visual features for robotic tasks instead of raw images. Thus, the predicted keypoints may form part of the observations/characterization of the environment that the reinforcement learning system determines actions based upon. The reinforcement learning system can then learn an action selection policy for performing a task in accordance with any reinforcement learning technique. The system can select actions for the robotic system to perform on the basis of received observations of the environment, i.e. the predicted keypoints. The robotic system can then carry out the actions. The actions interact with the environment to generate new observations which in turn can be used for selecting new actions. The environment may be a real-world environment or in training, the environment may be a simulation of the real-world environment. In this way, the observation relates to a real-world environment and the selected action relates to an action to be performed by the robotic system. The action selection policy, which may be implemented as one or more neural networks, controls the robotic system to perform the task while interacting with the real-world environment by obtaining the observations from one or more sensors sensing the real-world environment, in this case, obtaining synchronized camera images and generating predicted keypoints, and using the policy output to select actions to control the robotic agent to perform the task.

The subject matter described in this specification can be implemented in particular embodiments so as to realize one or more of the following advantages. By using a new self-supervised loss in combination with a supervised loss on a small number of labeled samples to train a neural network, the described training techniques allow the trained neural network to provide a robust tracking of 3D keypoints of dynamic objects captured in input images while reducing the amount of supervision, i.e., the amount of labeled samples that are included in the training data for the neural network.

In particular, the described techniques use a small amount of image data labeled with pre-determined keypoints (e.g., human annotations) and use a large corpus of unlabeled, but synchronized multi-view image data captured by multiple cameras from different points of view to self-supervise via multi-view 3D consistency. The data used for training is generally inexpensive to obtain (e.g., RGB camera images). The scene itself can be dynamic as long as the cameras are synchronized. In this way, the trained neural network can generate keypoints of objects (even unseen objects, i.e., objects that do not appear in the images used to train the neural network) that are consistent both across views and with the human annotations, i.e., with the labels for the labeled images. Thus, the described techniques can lead to a robust detector grounded in the preferences of the annotator and enable robust and view-independent tracking of keypoints without requiring high quality data such as depth images, 3D scans or any other pre-framed models (e.g., object segmentation or foreground/background detection), thereby reducing the computational resources needed to obtain high quality data and reducing the complexity of the training system.

Further, the described techniques do not rely on image space reconstructions which become inapt in cases with rich backgrounds. Keypoints detected by the trained neural network also do not need to be tied to surface points, i.e., they can be inside objects or correspond to no physical location as long as they are semantically and geometrically consistent.

Unlike unstructured visual representations, keypoints are human understandable and provide actionable representation for robotic controllers. By providing a robust tracking of 3D keypoints of dynamic objects, the described techniques allow for robots that are controlled using the trained neural network to perform tasks that require precision and generalization with only a small amount of human labor. For reinforcement learning tasks which often require complex feedback and usually take a long time to train a robotic agent (specifically when the task requires processing raw images), keypoints generated by the trained neural network can act as a good summary of a visual scene and can be used as visual features for robotic tasks to avoid having to learn from raw images.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flow diagram of an example process for determining an unsupervised loss function.

FIG. 4 is a flow diagram of an example process for training a keypoint prediction neural network.

Like reference numbers and designations in the various drawings indicate like elements.

DETAILED DESCRIPTION

This specification describes a system implemented as computer programs on one or more computers in one or more locations that train a keypoint prediction network to predict keypoints of unseen objects using a training data set including labeled and unlabeled training data.

In some implementations, the objects can be dynamic objects such as people, animals, vehicles, or robotic agents. A keypoint of an object is a point on the object, e.g., a point that is important for recognizing the object or motion of the object. For example, a keypoint may be a point on a head, front paws, body or tail of a moving animal. As another example, a keypoint may be a joint of a robotic arm or leg. In some other implementations, the objects can be static objects in an environment, e.g., an environment which a robotic agent is interacting with.

In some implementations, keypoints predicted by the trained neural network can be used to control a robotic system to perform a robotic task, e.g., by using a reinforcement learning technique to learn a control policy. In these implementations, the predicted keypoints can act as a good summary of a visual scene and can be used as visual features for the robotic task to avoid having to learn the features from raw images, thus reducing time for training a robotic agent to perform the task. For example, given a task that requires a robotic agent to insert an audio plug into a socket, the trained neural network can be used to predict keypoints which are the plug tip, plug base, and socket position. As another example, given a task that requires a robotic agent to navigate an environment (e.g., an autonomous vehicle navigating a street to reach a destination), the trained neural network can be used to predict keypoints of pedestrians and/or other vehicles on the street so that the autonomous vehicle can avoid collision with pedestrian and other vehicles and safely reach the destination. These predicted keypoints would allow the robotic agent to navigate the surrounding environment and quickly complete the task with high precision.

Figure 1:
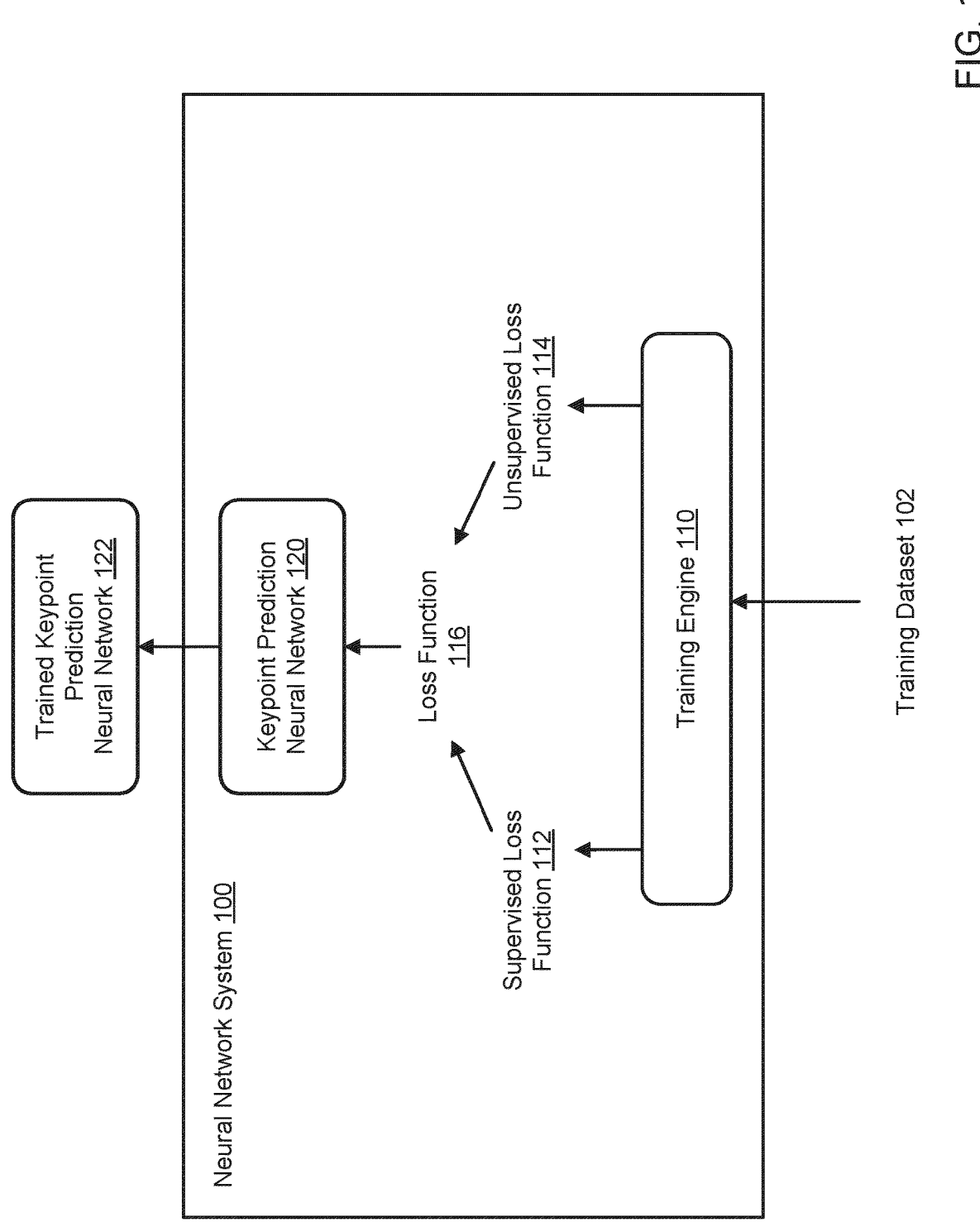
FIG. 1 shows an example neural network system.

FIG. 1 shows an example neural network system. The system 100 is an example of a system implemented as computer programs on one or more computers in one or more locations, in which the systems, components, and techniques described below can be implemented.

The system 100 includes a training engine 110 configured to train a keypoint prediction neural network 120. The training engine 110 can be implemented as one or more software modules or components, installed on one or more computers in one or more locations.

The keypoint prediction neural network 120 has a plurality of parameters. The system 100 can initialize initial values of parameters of the network 120, e.g., to zeros or to random values sampled from an appropriate distribution.

Generally, the neural network 120 is configured to receive an input image depicting a scene and to process the input image to generate an output. The output of the neural network 120 includes a respective heat-map for each of a plurality of different possible keypoints of one or more objects in the scene. The heat-maps can be generated in parallel, i.e., in a single pass through the neural network. The heat-map for a given possible keypoint includes a respective score for each of a plurality of locations (2D locations) in the image, e.g., for each pixel in the image, that represents the likelihood that the given possible keypoint is located at the location.

The neural network 120 can include one or more of (i) one or more down-sampling layers, (ii) one or more convolutional layers, (iii) one or more residual layers, (iv) one or more up-sampling layers, (v) a spatial argmax layer, (vi) a bilinear up-sampling layer, (vii) a 3D estimation layer, or (viii) a softmax layer.

Figure 5:
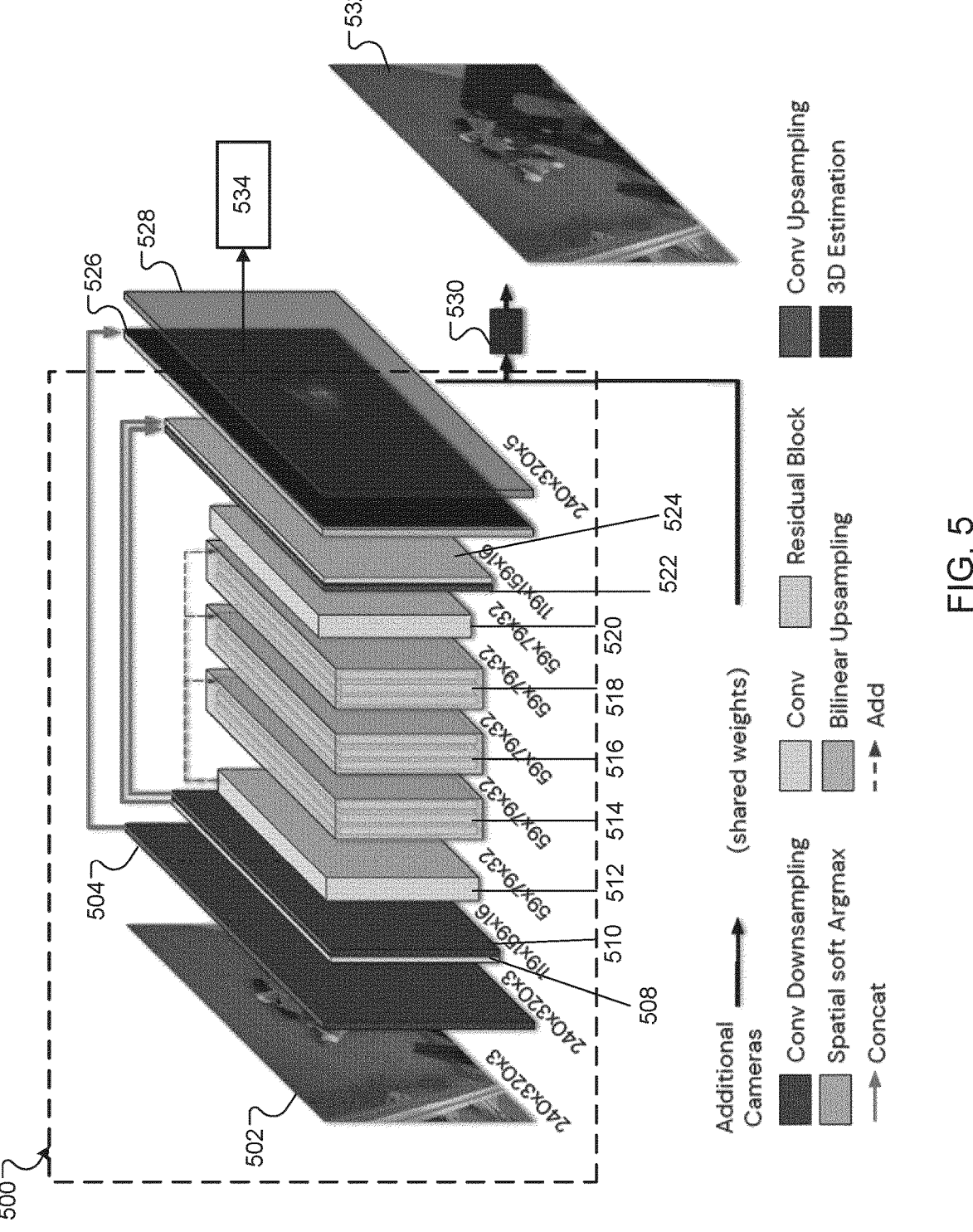
FIG. 5 illustrates an example architecture of a keypoint prediction neural network.

An example architecture 500 of the keypoint prediction neural network 120 is illustrated in FIG. 5. The input to the network is a single camera image 502 depicting a scene and the output 534 of the network includes a respective heat-map for each of a plurality of different possible keypoints of one or more objects in the scene.

The example architecture 500 of the neural network includes (i) a first convolutional down-sampling layer 504, followed by (ii) a first convolutional neural network layer 508, followed by (iii) a second convolutional down-sampling layer 510, followed by (iv) a second convolutional neural network layer 512, followed by (v) a stack of three residual blocks (including block 514 followed by block 516 followed by block 518), followed by (vi) a third convolutional neural network layer 520, followed by (vii) a convolutional up-sampling layer 522, followed by (viii) a fourth convolutional neural network layer 524, followed by a (ix) bilinear up-sampling layer 526, followed by (x) a spatial softmax layer 528.

Each of the layers of the architecture 500 receives a respective layer input and generates a respective layer output. The first convolutional down-sampling layer is configured to receive an input image 502 as its layer input. The layer output of each layer is used as input to the next layer in the architecture 500, i.e., the next layer or the output layer. Each layer of the architecture 500 generates an output from a received input in accordance with current values of the parameters of the neural network.

In some implementations, a layer can receive as input the outputs of multiple preceding layers. For example, layer 526 can receive as input both of the output of layer 524 and the output of layer 504. Layer 522 can receive as input both of the output of layer 520 and output of layer 510. Layer 524 can receive as input both of the output of layer 522 and output of layer 508.

The system 100 of FIG. 1 can further include a 3D estimation layer, for example, the 3D estimation layer 530 configured to process the heat-maps generated by the keypoint prediction neural network for different camera images to generate an output 532 that includes an estimate of a 3D location of each possible keypoint of the one or more objects in the scene.

Referring back to FIG. 1, to train the neural network 120, the training engine 110 receives a training dataset 102 that includes a plurality of training samples. Each training sample includes a set of synchronized images of one or more objects from a respective scene. Each image in the set is synchronously taken by a respective camera from a different point of view (or viewpoint) of the same scene. The set of synchronized images in each training sample includes a subset of labeled images and a subset of unlabeled images. Each labeled image in the subset of labeled images is labeled with ground-truth keypoints that represent important points on the one or more objects in the scene. Each image in the subset of unlabeled images is not labeled with any ground-truth keypoints. It will be appreciated that it is possible that some training samples will not have any labeled images.

For each of one or more training samples of the plurality of training samples, the system 100 trains the neural network 120 on the training sample by updating current values of parameters of the neural network 120 to minimize a loss function 116. The loss function is a combination of a supervised loss function 112 and an unsupervised loss function 114.

The supervised loss function 112, denoted as $L_{sup}$, minimizes a difference between the ground-truth keypoints and respective predicted keypoints generated by the neural network 120 for the labeled images in accordance with the current values of the parameters of the neural network 120.

For example, for each labeled image in the training sample and for each of the ground-truth keypoints in the labeled image, the training engine 110 constructs a respective ground-truth heat-map of the ground-truth keypoint in the labeled image. The training engine 110 generates, using the neural network 120 with the current values of the parameters of the neural network 120, a respective predicted heat-map of the ground-truth keypoint in the labeled image. The training engine 110 computes a Kullback-Leibler (KL) divergence of the respective ground-truth heat-map and the respective predicted heat-map. The supervised loss function is a combination of the computed KL divergences. The process for determining the supervised loss function is described in more detail with reference to FIG. 2.

The unsupervised loss function 114, denoted as $L_{unsup}$, minimizes multi-view inconsistency among respective predicted keypoints generated by the neural network 120 for the unlabeled images taken from different points of view of a same scene in accordance with the current values of the parameters of the neural network 120. Thus, the unsupervised loss function 114 encourages the predicted keypoints generated by the neural network 120 for one or more objects in the same scene to be consistent across the unlabeled images, because the unlabeled images are taken by different cameras from different points of view of the same scene and therefore depict the same objects.

For example, for each of the unlabeled images in the training sample, the training engine 110 generates respective bootstrapped keypoints for the unlabeled image that are treated as labels for the unlabeled image. For each of the respective bootstrapped keypoints, the engine 110 constructs a respective bootstrapped heat-map of the bootstrapped keypoint. The engine 110 generates, using the neural network 120 in accordance with the current values of the parameters, a respective predicted heat-map of the bootstrapped keypoint. The engine 110 computes, a KL divergence of the respective bootstrapped heat-map and the respective predicted heat-map. The unsupervised loss function 114 is a combination of the computed KL divergences. The process for determining the unsupervised supervised loss function 114 is described in more detail with reference to FIG. 3.

In some implementations, the loss function 116 may include an additional component to regularize the parameters of the neural network 120. The loss function 116 can be a weighted combination of the supervised loss function, the unsupervised loss function, and the additional component. For example, the loss function 116, denoted as $L_{total}$, can take the following form:

$$L_{total} = L_{sup} + \alpha L_{unsup} + \lambda \|\theta_{nonbias}\|^2$$

where $\alpha$, $\lambda$ are weights that are hyperparameters or fixed constants, and $\|\theta_{nonbias}\|^2$ is L2 regularization on all non-bias parameters of the keypoint prediction neural network 120.

For each batch of one or more labeled images and one or more unlabeled images of the training sample, the training engine 110 trains the neural network 120 on the training sample by updating current values of parameters of the neural network 120 to minimize the loss function 116 using a conventional neural network training technique, e.g., a gradient descent-based training technique. In particular, the training engine 110 can determine an estimate of a gradient of the loss function 116 and backpropagate the estimate of the gradient of the loss function 116 to determine a respective updated value for each of the parameters of the neural network 120.

After the training engine 110 has trained the neural network 120 on the one or more training examples, the system 100 obtains a trained keypoint prediction neural network 122 that has final updated values of the parameters. In some implementations, the system 100 uses the trained keypoint prediction neural network 122 to process a new image to generate keypoints of one or more objects in a scene depicted by the new image. Alternatively or additionally, the system 100 can provide the trained keypoint prediction neural network 122 to another system that uses the trained keypoint prediction neural network 122 to process a new image to generate keypoints of one or more objects in a scene depicted by the new image. In either of these cases, the generated keypoints can optionally be used to perform a downstream task, e.g., one of the downstream tasks described above.

Figure 2:
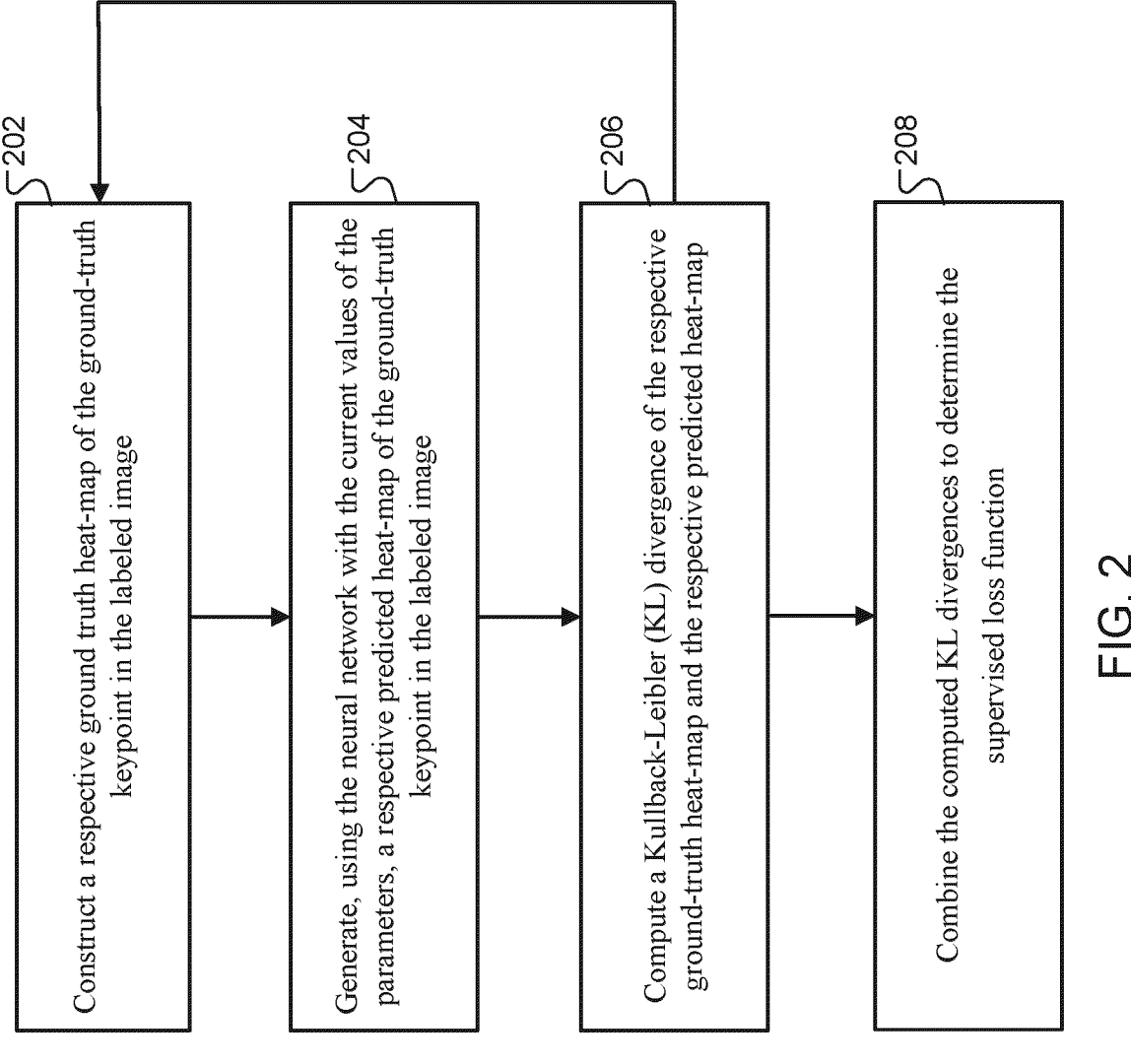
FIG. 2 is a flow diagram of an example process for determining a supervised loss function.

FIG. 2 is a flow diagram of an example process 200 for determining the supervised loss function for training the keypoint prediction neural network. For convenience, the process 200 will be described as being performed by a system of one or more computers located in one or more locations. For example, a neural network system, e.g., the neural network system 100 of FIG. 1, appropriately programmed in accordance with this specification, can perform the process 200.

As discussed above, each training sample includes a subset of labeled images and a subset of unlabeled images. Each labeled image is labeled with a plurality of K ground-truth keypoints. Each ground-truth keypoint is associated with respective 2D location coordinates.

For each labeled image c and for each ground-truth keypoint k of the plurality of K ground-truth keypoints in the labeled image c, the system performs steps 202-206 as follows. The system constructs a respective ground-truth heat-map of the ground-truth keypoint in the labeled image (step 202). In particular, for each ground-truth keypoint k, the system computes 3D location coordinates $x_k$ of the ground-truth keypoint based on 2D location coordinates of the ground-truth keypoint and based on camera calibration.

The system projects the 3D location coordinates $x_k$ onto image planes of the labeled image $I_c$ taken by camera c. The images coordinates of the back-projected keypoint k into the labeled image $I_c$ can be denoted as $i_{ck}, j_{ck}$. The system constructs a Gaussian image centered at the image coordinates $i_{ck}, j_{ck}$ with a width σ. This creates the respective ground-truth heat-map $H_{ck}(ij)$ having the following form:

$$H_{ck}(ij) \propto \exp((-(i_{ck}-i)^2-(i_{ck}-j)^2)/(2\sigma^2))$$

where i and j are coordinates in the ground-truth heat-map. The width and height of the Gaussian image match the dimensions of the input labeled image c. The width σ is a predetermined hyper-parameter.

The system generates, using the keypoint prediction neural network with current values of the parameters of the neural network, a respective predicted heat-map of the ground-truth keypoint in the labeled image (step 204).

In particular, let f denote the keypoint prediction neural network and θ denote the parameters of the keypoint prediction neural network, the system generates the respective predicted heat-map (denoted as $P_{ck}$) of the ground-truth keypoint kin the labeled image $I_c$ as follows:

$$P_{ck}=\text{softmax}(f(I_c, \theta)_k,$$

where the softmax operation is performed separately for each keypoint and labeled image. It is noted that the same keypoint prediction neural network with the same values of parameters is applied to each viewpoint to obtain the ground-truth heat-maps for all ground-truth keypoints in the labeled image taken from that viewpoint. The same keypoint prediction neural network is applied to each viewpoint to provide predicted heat-maps for keypoints in general.

The system computes a Kullback-Leibler (KL) divergence of the respective ground-truth heat-map and the respective predicted heat-map (step 206). The KL divergence of the respective ground-truth heat-map and the respective predicted heat-map can be represented as follows: $D_{KL}(H_{ck}\|\text{softmax}(f(I_c, \theta)_k))$.

KL divergence is described in detail in Kullback, S. and Leibler, R. A. (1951) On Information and Sufficiency. The Annals of Mathematical Statistics, 22, 79-86.

It will be appreciated that the above method can also include the remaining unlabeled images of the training sample. The computed 3D location coordinates $x_k$ of the ground-truth keypoint can be back-projected into the unlabeled images based upon on the camera calibration to give 2D locations from which ground-truth heat-maps can be constructed for each unlabeled image. The KL divergence can then be computed as described above and be included in the supervised loss function.

The system combines the KL divergences computed for each ground-truth keypoint in each labeled image to deter-mine the supervised loss function (step 208). For example, the supervised loss function can be determined as follows:

$$\mathcal{L}_{sup} = \sum_c^C \sum_k^K D_{KL}(H_{ck}\|\text{softmax}(f(I_c, \theta)_k)).$$

In some implementations, the system can combine a weighted combination of the computed KL divergence to determine the supervised loss function. Each KL divergence can be weighted by an associated importance factor. The associated importance factor of each KL divergence can be a function of a variance of the respective predicted heat-map.

FIG. 3 is a flow diagram of an example process 300 for determining the unsupervised loss function for training the keypoint prediction neural network. For convenience, the process 300 will be described as being performed by a system of one or more computers located in one or more locations. For example, a neural network system, e.g., the neural network system 100 of FIG. 1, appropriately pro-grammed in accordance with this specification, can perform the process 300.

As discussed in the description of FIG. 1, each training sample includes a subset of labeled images and a subset of unlabeled images.

The system determines the unsupervised loss function using the subset of unlabeled images in the training sample. The unlabeled images are simultaneous images of the same scene. That means, each of the unlabeled images is taken by a respective camera from a different point of view (or viewpoint) of the same scene, and all of the unlabeled images are taken by the respective cameras simultaneously. The system does not have explicit labels (i.e., ground-truth keypoints) for each of the unlabeled images.

Thus, for each of the unlabeled images in the training sample, the system generates respective bootstrapped key-points for the unlabeled image (step 302). In particular, the system estimates 3D location coordinates of each of the bootstrapped keypoints of one or more objects of the scene. To estimate 3D location coordinates of each of the boot-strapped keypoints, the system solves a weighted least-squares optimization problem, which will be described in more detail below. The bootstrapped keypoints are treated as labels for the unlabeled images, thus allowing the neural network to self-supervise from its own predictions in a 3D-consistent way.

For each bootstrapped keypoint k of the respective boot-strapped keypoints, the system performs steps 304-308 as follows.

The system constructs a respective bootstrapped heat-map for the bootstrapped keypoint k (step 304).

The system projects the estimated 3D location coordinates $\tilde{x}_k$ onto image planes of the unlabeled image $I_c$ taken by camera c. The image coordinates of the back-projected keypoint k into the labeled image $I_c$ can be denoted as $i_{ck}, j_{ck}$. The system constructs a respective bootstrapped heat-map $\hat{H}_{ck}(i,j)$ of the bootstrapped keypoint k as a Gaussian image centered at the image coordinates $i_{ck}, j_{ck}$ with a width σ. This creates the respective bootstrapped heat-map $\hat{H}_{ck}(i,j) \approx \exp((-(i_{ck}-i)^2-(i_{ck}-j)^2)/(2\sigma^2))$, where i and j are coordinates in the bootstrapped heat-map.

The system generates, using the keypoint prediction neu-ral network in accordance with the current values of the parameters of the neural network, a respective predicted heat-map for the bootstrapped keypoint (step 306).

In particular, the system generates the respective predicted heat-map (denoted as $P_{ck}$) of the bootstrapped keypoint k in the unlabeled image $I_c$ as follows:

$$P_{ck} = \text{softmax}(f(I_c, \theta)_k,$$

where the softmax operation is performed separately for each keypoint and unlabeled image. The sum in the softmax operation happens across image pixels of the unlabeled image $I_c$, i.e., the image pixels are treated as different image classes.

Referring back to step 302, to estimate the 3D location coordinates of each bootstrapped keypoint, the system determines the mean of $P_{ck}$ (denoted as $(x_{mean}, y_{mean})$) which corresponds to an image position, from which a direction can be computed via calibration. The image position is a location within the unlabeled image defined by $(x_{mean}, y_{mean})$. The direction creates a ray for each camera in the direction of the image position computed based on $P_{ck}$ (in 3D coordinates, imagine that there is a virtual line running through a camera, then the orientation of the line could be referred to as the direction and the virtual line would represent a ray for that camera).

For example, to determine the mean of $P_{ck}$, the system may determine the expected value in the image indices (i.e., image classes) using $P_{ck}$ as a probability distribution. To find the image position of the mean in x and y, the system may compute $x_{mean} = \Sigma_i \Sigma_j (j P_{ck}[i,j])$ and $y_{mean} = \Sigma_i \Sigma_j (i P_{ck}[i,j])$, where (i, j) denotes coordinates of each pixel in the image $I_c$.

Assuming that every keypoint appears on the scene exactly once, the 3D location estimate of a bootstrapped keypoint k (denoted as $\hat{x}_k$) can be defined as a point for which the sum of squares of distances from these rays to the point is minimized. This defines a quadratic cost for $\hat{x}_k$ and therefore can be analytically solved. In particular, assuming the location of camera c is denoted as $a_c$ and the normalized direction of the ray from camera c through bootstrapped keypoint k is denoted as $\hat{d}_{ck}$, by solving the above weighted least-squares problem, the system can obtain the following equation which yields the estimated 3D location coordinates:

$$\tilde{x}_k = \left( \sum_c^C I - \hat{d}_{ck} \hat{d}_{ck}^T \right)^{-1} \left( \sum_c^C w_{ck} \left( I - \hat{d}_{ck} \hat{d}_{ck}^T \right) a_c \right)$$

$\tilde{x}_k$ is treated as a label (i.e., ground-truth keypoint) and is not back propagated through during training.

It will be appreciated that step 306 may be performed as part of step 302.

The system computes a KL divergence of the respective bootstrapped heat-map and the respective predicted heat-map as follows (step 308):

$$D_{KL}(\tilde{H}_{ck} \| \text{softmax}(f(I_c, \theta)_k)$$

The system combines the KL divergences computed for each bootstrapped keypoint in each unlabeled image to determine the unsupervised loss function (step 310). For example, the unsupervised loss function can be denoted as $L_{unsup}$ and determined as follows:

$$\mathcal{L}_{unsup} = \sum_c^C \sum_k^K D_{KL}(\tilde{H}_{ck} \| \text{softmax}(f(I_c, \theta)_k)),$$

where $\tilde{H}_{ck}$ is created from the bootstrapped keypoints' 3D location coordinates $\tilde{x}_k$.

In some implementations, it is not always desirable to incorporate all predictions from all cameras, e.g. due to certain keypoints dropping out of view or becoming occluded. Additionally, it may be desirable to put a higher weight on the camera views with the more confident predictions of heat-maps over keypoints. Thus, in some implementations, the system determines the unsupervised loss function based on a weighted combination of the computed KL divergences. Each KL divergence can be weighted by an associated importance factor which represents the importance of each predicted heat-map $P_{ck}$ (i.e., predicted heat-maps associated with camera views that have more confident predictions are more important). The associated importance factor of each KL divergence can be a function of a variance of the respective predicted heat-map. For example, the associated importance factor can be computed as follows:

$$w_{ck} = \text{sigm}(3 \tanh(5(1 - \sqrt{\text{var}_{ck}}/2/\sigma))),$$

where $\text{var}_{ck}$ is a variance of the respective predicted heat-map $P_{ck}$, sigm is a sigmoid function and tanh a hyperbolic tangent function.

FIG. 4 is a flow diagram of an example process for training a keypoint prediction neural network. For convenience, the process 400 will be described as being performed by a system of one or more computers located in one or more locations. For example, a neural network system, e.g., the neural network system 100 of FIG. 1, appropriately programmed in accordance with this specification, can perform the process 400.

The system receives a training dataset including a plurality of training samples (step 402). Each training sample includes a set of synchronized images of one or more objects from a respective scene. Each image in the set is synchronously taken by a respective camera from a different point of view. A subset of the set of synchronized images is labeled with ground-truth keypoints and the remaining images in the set are unlabeled.

For each training sample, the system trains the neural network on the training sample by updating current values of parameters of the neural network to minimize a loss function (step 404). The loss function is a combination of a supervised loss function and an unsupervised loss function. The supervised loss function minimizes a difference between the ground-truth keypoints and respective predicted keypoints generated by the neural network for the labeled images in accordance with the current values of the parameters of the neural network. The unsupervised loss function minimizes multi-view inconsistency among respective predicted keypoints generated by the neural network for the unlabeled images taken from different points of view of a same scene in accordance with the current values of the parameters. In some implementations, the loss function comprises an additional component to regularize the parameters. In some implementations, the loss function is a weighted combination of the supervised loss function, the unsupervised loss function, and the additional component.

In particular, to train the neural network, for each of one or more training samples of the plurality of training samples, the system performs steps 406 and 408 as follows.

The system determines an estimate of a gradient of the loss function (step 406). The system can determine the estimate of the gradient of the loss function by using a gradient descent technique such as batch gradient descent, stochastic gradient descent, or mini-batch gradient descent.

The system backpropagates the estimate of the gradient of the loss function to determine a respective updated value for each of the parameters of the neural network (step 408). For example, the system can backpropagate the estimate of the gradient of the loss function to determine the respective updated value for each of the parameters using a gradient descent optimizer such as Adaptive Moment Estimation (Adam) optimizer or RMSprop optimizer.

The system can repeat the above training process until one or more criteria are satisfied, for example, until a desired performance (e.g., a predetermined level of accuracy) of the neural network is achieved, until a computational budget for training has been reached, or until the neural network has been trained on a predetermined number of training samples.

After the training, the system obtains a trained keypoint prediction neural network that has final updated values of the parameters. In some implementations, the system uses the trained keypoint prediction neural network to process a new image to generate predicted keypoints of one or more objects in a scene depicted by the new image. Alternatively or additionally, the system can provide the trained keypoint prediction neural network to another system that uses the trained keypoint prediction neural network to process a new image to generate predicted keypoints of one or more objects in a scene depicted by the new image.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers.

The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for training a neural network to predict keypoints of unseen objects using a training dataset comprising labeled and unlabeled training data, the method comprising:

receiving the training dataset comprising a plurality of training samples, each training sample comprising a set of synchronized images of one or more objects from a respective scene, wherein each image in the set is synchronously taken by a respective camera from a different point of view, and wherein a subset of the set of synchronized images is labeled with ground-truth keypoints and the remaining images in the set are unlabeled; and for each of one or more training samples in the plurality of training samples:

for each labeled image in the training sample and for each of the ground-truth keypoints in the labeled image:

constructing a respective ground-truth heat-map of the ground-truth keypoint in the labeled image, and generating, using the neural network with the current values of the parameters, a respective predicted heat-map of the ground-truth keypoint in the labeled image, and training the neural network on the training sample by updating current values of parameters of the neural network to minimize a loss function, wherein the loss function is a combination of a supervised loss function and an unsupervised loss function, wherein the supervised loss function minimizes a difference between the ground-truth heat-maps and the predicted heat-maps generated by the neural network for the labeled images in accordance with the current values of the parameters of the neural network, and wherein the unsupervised loss function minimizes multi-view inconsistency among respective predicted keypoints generated by the neural network for the unlabeled images taken from different points of view of a same scene in accordance with the current values of the parameters, and wherein the neural network is configured to receive an input image and to generate, for each of a plurality of possible keypoints of one or more objects in the input image, a respective heat-map for the possible keypoint including a respective score for each of a plurality of locations in the input image, the respective score representing a likelihood that the possible keypoint is located at the location.

2. The method of claim 1, wherein the one or more objects in the scene are dynamic objects.

3. The method of claim 1, wherein the neural network comprises one or more of (i) one or more down-sampling layers, (ii) one or more convolutional layers, (iii) one or more residual layers, (iv) one or more up-sampling layers, (v) a spatial argmax layer, (vi) a bilinear up-sampling layer, (vii) a 3D estimation layer, or (viii) a softmax layer.

4. The method of claim 1, wherein the neural network is configured to generate the respective heat-maps in parallel.

5. The method of claim 1, wherein the loss function comprises an additional component to regularize the parameters.

6. The method of claim 5, wherein the loss function is a weighted combination of the supervised loss function, the unsupervised loss function, and the additional component.

7. The method of claim 1, wherein the method comprises, for each labeled image in the training sample and for each of the ground-truth keypoints in the labeled image:

computing a Kullback-Leibler (KL) divergence of the respective ground-truth heat-map and the respective predicted heat-map, and wherein the supervised loss function is a combination of the computed KL divergences.

8. The method of claim 7, wherein the method comprises, for each of the unlabeled images in the training sample:

generating respective bootstrapped keypoints for the unlabeled image, wherein the bootstrapped keypoints are treated as labels for the unlabeled image, for each of the respective bootstrapped keypoints:

constructing a respective bootstrapped heat-map of the bootstrapped keypoint, generating, using the neural network in accordance with the current values of the parameters, a respective predicted heat-map of the bootstrapped keypoint, computing a KL divergence of the respective bootstrapped heat-map and the respective predicted heat-map, and wherein the unsupervised loss function is a combination of the computed KL divergences.

9. The method of claim 7, wherein generating the respective bootstrapped keypoints in the unlabeled image comprises solving a weighted least-squares optimization problem.

10. The method of claim 7, wherein each KL divergence is further weighted by an associated importance factor in the loss function.

11. The method of claim 10, wherein the associated importance factor of each KL divergence is a function of a variance of the respective predicted heat-map.

12. The method of claim 1, wherein the one or more objects in the respective scene are (i) one or more robotic systems or (ii) one or more objects in an environment that the one or more robotic systems are interacting with.

13. The method of claim 12, wherein the predicted keypoints are used to control the one or more robotic systems.

14. The method of claim 13, wherein controlling the one or more robotic systems comprises using a reinforcement learning technique to learn a control policy.

15. A system comprising one or more computers and one or more storage devices storing instructions that, when executed by the one or more computers, cause the one or more computers to perform operations for training a neural network to predict keypoints of unseen objects using a training dataset comprising labeled and unlabeled training data, the operations comprising:

receiving the training dataset comprising a plurality of training samples, each training sample comprising a set of synchronized images of one or more objects from a respective scene, wherein each image in the set is synchronously taken by a respective camera from a different point of view, and wherein a subset of the set of synchronized images is labeled with ground-truth keypoints and the remaining images in the set are unlabeled; and for each of one or more training samples in the plurality of training samples:

for each labeled image in the training sample and for each of the ground-truth keypoints in the labeled image:

constructing a respective ground-truth heat-map of the ground-truth keypoint in the labeled image, and generating, using the neural network with the current values of the parameters, a respective predicted heat-map of the ground-truth keypoint in the labeled image, and training the neural network on the training sample by updating current values of parameters of the neural network to minimize a loss function, wherein the loss function is a combination of a supervised loss function and an unsupervised loss function, wherein the supervised loss function minimizes a difference between the ground-truth heat-maps and the predicted heat-maps generated by the neural network for the labeled images in accordance with the current values of the parameters of the neural network, and wherein the unsupervised loss function minimizes multi-view inconsistency among respective predicted keypoints generated by the neural network for the unlabeled images taken from different points of view of a same scene in accordance with the current values of the parameters, and wherein the neural network is configured to receive an input image and to generate, for each of a plurality of possible keypoints of one or more objects in the input image, a respective heat-map for the possible keypoint including a respective score for each of a plurality of locations in the input image, the respective score representing a likelihood that the possible keypoint is located at the location.

16. One or more non-transitory computer storage media storing instructions that, when executed by one or more computers, cause the one or more computers to perform operations for training a neural network to predict keypoints of unseen objects using a training dataset comprising labeled and unlabeled training data, the operations comprising:

receiving the training dataset comprising a plurality of training samples, each training sample comprising a set of synchronized images of one or more objects from a respective scene, wherein each image in the set is synchronously taken by a respective camera from a different point of view, and wherein a subset of the set of synchronized images is labeled with ground-truth keypoints and the remaining images in the set are unlabeled; and for each of one or more training samples in the plurality of training samples:

for each labeled image in the training sample and for each of the ground-truth keypoints in the labeled image:

constructing a respective ground-truth heat-map of the ground-truth keypoint in the labeled image, and generating, using the neural network with the current values of the parameters, a respective predicted heat-map of the ground-truth keypoint in the labeled image, and training the neural network on the training sample by updating current values of parameters of the neural network to minimize a loss function, wherein the loss function is a combination of a supervised loss function and an unsupervised loss function, wherein the supervised loss function minimizes a difference between the ground-truth heat-maps and the predicted heat-maps generated by the neural network for the labeled images in accordance with the current values of the parameters of the neural network, and wherein the unsupervised loss function minimizes multi-view inconsistency among respective predicted keypoints generated by the neural network for the unlabeled images taken from different points of view of a same scene in accordance with the current values of the parameters, and wherein the neural network is configured to receive an input image and to generate, for each of a plurality of possible keypoints of one or more objects in the input image, a respective heat-map for the possible keypoint including a respective score for each of a plurality of locations in the input image, the respective score representing a likelihood that the possible keypoint is located at the location.

17. The system of claim 15, wherein the one or more objects in the scene are dynamic objects.

18. The system of claim 15, wherein the neural network is configured to receive an input image and to generate, for each of a plurality of possible keypoints of one or more objects in the input image, a respective heat-map over the possible keypoint.

* * * * *